United States Patent
Millet et al.

(10) Patent No.: US 6,961,335 B1
(45) Date of Patent: Nov. 1, 2005

(54) MULTI-LAYER RING ARCHITECTURE FOR FIBER-TO-THE-HOME TELCO CARRIER NETWORK

(75) Inventors: Raymond Ian Millet, Bowie, MD (US); R. Andrew Poole, Round Hill, VA (US); N. Sharon Embrey, Alexandria, VA (US); Robert D. Farris, Sterling, VA (US); David Harold Cave, Fairfax, VA (US); John M. Carman, Alexandria, VA (US); Faye M. Smith, Alexandria, VA (US); Lin H. Kerns, Springfield, VA (US); Kyle Vincent Evans, Dallas, TX (US); Dale Lee Bartholomew, Vienna, VA (US)

(73) Assignee: Verizon Communications Inc., New York, NY (US)

(*) Notice: Subject to any disclaimer, the term of this patent is extended or adjusted under 35 U.S.C. 154(b) by 672 days.

(21) Appl. No.: 10/158,586

(22) Filed: May 31, 2002

(51) Int. Cl.[7] .............................................. H04L 12/66
(52) U.S. Cl. ...................................... 370/356; 370/406
(58) Field of Search ................................ 370/352, 353, 370/355, 356, 400, 401, 404, 405, 406, 410, 370/465, 466, 469, 907, 419, 463, 467; 398/58, 398/59

(56) References Cited

U.S. PATENT DOCUMENTS

| | | |
|---|---|---|
| 5,541,917 A | 7/1996 | Farris |
| 5,751,789 A | 5/1998 | Farris et al. |
| 5,859,895 A | 1/1999 | Pomp et al. |
| 5,864,415 A | 1/1999 | Williams et al. |
| 5,864,542 A | 1/1999 | Gupta et al. |
| 6,002,502 A | 12/1999 | Pomp et al. |
| 6,047,063 A | 4/2000 | Perry |
| 6,272,151 B1 | 8/2001 | Gupta et al. |
| 6,526,581 B1 | 2/2003 | Edson |
| 6,681,232 B1 | 1/2004 | Sistanizadeh et al. |
| 6,684,030 B1 | 1/2004 | Taylor et al. |
| 6,718,444 B1 * | 4/2004 | Hughes ....................... 711/155 |
| 6,765,903 B1 * | 7/2004 | Allen et al. .................. 370/356 |
| 6,822,960 B1 * | 11/2004 | Manchester et al. ......... 370/394 |

(Continued)

FOREIGN PATENT DOCUMENTS

WO    WO 01/09739 A1    2/2001

OTHER PUBLICATIONS

Dr. Kamran Sistanizadeh, "Spanning the Enterprise with Gigabit Ethernet", 2001 Yipes Communications, Inc.

(Continued)

*Primary Examiner*—Brian Nguyen
(74) *Attorney, Agent, or Firm*—McDermott Will & Emery LLP

(57) ABSTRACT

A communications network, for example forming a local exchange carrier telephone network, utilizes three layers of fiber optic rings. The point of demarcation between customer premises media and network media comprises an intelligent soft network interface device or "soft NID". First layer rings carry telephone and data communications between the soft NIDs and remote terminals. Several remote terminals in an area communicate via one of the next higher level rings to a host digital terminal. The host digital terminals communicate with each other via a backbone optical fiber ring, and a media gateway controller on this ring provides high level service logic. The remote terminals and preferably the host digital terminals are service switching points (SSPs), for intelligent services provided by the network. Local legacy switches connect to remote terminals, whereas a router on the backbone provides communications to other networks, including legacy long distance networks.

22 Claims, 5 Drawing Sheets

U.S. PATENT DOCUMENTS

| | | |
|---|---|---|
| 2001/0024438 A1 | 9/2001 | Sugiyama et al. |
| 2001/0027983 A1 | 10/2001 | Stadelhofer |
| 2001/0028488 A1 | 10/2001 | Kim et al. |
| 2001/0039660 A1 | 11/2001 | Vasilevsky et al. |
| 2001/0055380 A1 | 12/2001 | Benedyk et al. |
| 2002/0027983 A1 * | 3/2002 | Suzuki ........................ 379/229 |
| 2002/0089715 A1 * | 7/2002 | Mesh et al. .................. 359/118 |
| 2004/0081167 A1 | 4/2004 | Hassan-Ali et al. |

OTHER PUBLICATIONS

Dr. Kamran Sistanizadeh, "Managed IP Optical Internetworking: A Regional IP-over-Fiber Network Service Architecture: Opportunity and Challenges in Networking Services for Business Customers", 2000 Yipes Communications, Inc.

Ali Kafel, "Softswitches and Softswitch-Based Architectures", N-2G: Feb. 14, 2001, Carrier IP World Forum 2001.

Plexus 9000 "Multiservice Switching System: Carrier-class multiservice switching system delivers unsurpassed density and cost savings for TDM voice, VoIP and VoATM services, independent of access methods".

Voice and Data Switching Solution Offers Unsurpassed Density and Reliability: "Intellingent, multiservice switching platform provides Class 4/5 services with unrivaled reliability and highest level of density in industry".

Plexus 9000 "Multiservice Switching System: PSTN. New Public Network. Voice. Data."

TDM Tandem Switching Solution: "Telica's softswitch-based, packet switch addresses immediate tandem capacity challenges and provides migration to a full end office solution."

PlexView Billing System: "Telica's billing system delivers non-stop revenue accounting to protect your bottom line."

Voice Packet Telephony Solution: "A High Capacity, Fault Tolerant TDM and VoP Switch, Allows switching of voice calls through the PSTN, IP and ATM networks."

Plex View: Element Manager: "Telica's PlexView Element Management System, An Integrated, Modular Solution for Network Management".

* cited by examiner

MULTI-LAYER RING ARCHITECTURE FOR FIBER-TO-THE-HOME TELCO CARRIER NETWORK

RELATED APPLICATION

This application is related to U.S. application Ser. No. 10/158,583 entitled "SOFT NETWORK INTERFACE DEVICE FOR DIGITAL BROADBAND LOCAL CARRIER NETWORKS" filed on May 31, 2002, now U.S. Pat. No. 6,898,276 issued May 24, 2005, the disclosure of which is entirely incorporated herein by reference.

FIELD OF INVENTION

The present subject matter relates to an advanced network architecture, for a local telephone company or similar carrier, utilizing multiple layers of optical fiber rings extending to the subscriber premises and to various elements of such a network architecture.

BACKGROUND

Increasingly, there is a need for a carrier network architecture capable of providing a variety of communication services, for example, ranging from voice grade telephone service to packet switched data services and broadband digital communications services. Modern society continues to create exponentially increasing demands for communication of various forms of information. Desired services now range from simple text and voice communications up through broadband communications for video and multimedia applications.

The existing telephone network has fostered much of this growth. However, the current architecture of that network, essentially designed in the 1960s, uses time division multiplex technology optimized for voice grade telephone services. Although many users are satisfied with the services of such a network, increasingly many customers are exploring competing options for obtaining communication services that involve much higher-rate digital communications. Consequently, telephone carriers are faced with a need to migrate the existing services up to a higher capacity network that will support those services as well as the newer broadband digital services demanded by sophisticated customers. These trends are forcing telephone service carriers to migrate to a fast packet network architecture supporting broadband services. Existing end office switches simply cannot handle broadband services and are not readily adaptable to the fast packet operations. A number of proposals have been suggested to upgrade or replace the telephone network, to provide the newer types of services.

For example, U.S. Pat. No. 5,864,415 to Williams et al. discloses a fiber-to-the-home network architecture. Optical fiber extends from the central office to an intelligent interface device within the home. The intelligent interface device provides interconnections to various analog and digital communication media within the home, including a telephone line and a data network (10BaseT cable). The Williams patent also suggests use of a ring architecture, for the higher-level portions of the network.

U.S. Pat. No. 5,541,917 to Robert D. Farris discloses an advanced intelligent network type communication system, which provides both telephone service and broadband service. The disclosed architecture includes service switching point (SSP) type telephone central offices, signaling transfer points (STPs) and a central controller implemented as an integrated service control point (ISCP). At least some services are provided via SSP type host digital terminals (HDTs) and/or asynchronous transfer mode (ATM) type SSP switches. The HDT, for example, communicates via optical fiber to optical network units (ONUs) at the curb-side, and it communicates with higher level elements of the network via fiber.

Recent proposals for fiber optic metro area networks, such as that described in the white paper: Sistanizadeh, "Managed IP Optical Internetworking, a Regional IP-over-Fiber Network Service Architecture," © 2000 Yipes Communications, Inc., suggest a multi-layered optical fiber ring network. A first level ring connects Ethernet switches that provide access for customer equipment to Ethernet switches in the distribution plane. A next level ring connects a number of the distribution switches, and this ring connects to a switch at a hub on the national ring network.

While these proposals for network architecture separately address some of the needs of the carrier, such as the incumbent local exchange carrier, from that carrier's perspective, each has certain shortcomings. For example, many of the more recent proposals, such as that by Sistanizadeh, have emphasized handling of broadband data traffic. Although these proposals envision carrying voice (e.g. as voice over IP traffic), they have not adequately addressed issues regarding service control, particularly in such a manner as to enable seamless migration of the wide range of existing telephone services from the old TDM switch network up to the newly proposed packet or ATM based network. Consequently, they have not really addressed issues of serving both newer broadband based applications as well as legacy telephone applications, which many telephone customers will continue to demand (and pay for) for many years to come.

Also several U.S. pre-grant patent publications to Benedyk et al. (US2001/0055380), Sugiyama et al. (US2001/0024438) and Suzuki (US2001/0027983) disclose proposals for using media gateways to interface time division multiplexing (TDM) based telephone equipment to IP-based wide area data networks. These documents also teach control of telephone service through the media gateways at least in part by control functionality provided by one or more media gateway controllers. These architectures apparently are intended as a migration or partial upgrade strategy for the existing telephone carriers. In a somewhat similar vein, Telica (of Marlboro, Mass.) offers a system for interfacing older telephone switches to an IP-based backbone network. Telica proposes a network architecture in which a specialized gateway device interfaces telephone calls and other communications to and from a packet data core network. Although the functions may be integrated in a single device or 'box' having both switching fabric and service logic, they have also suggested the possibility of a more distributed implementation. These proposals have focused on enhanced transport in higher levels of the network. Although such an approach alleviates congestion at the tandem level, that approach does not address issues relating to broadband service transport through levels beyond the backbone. The broadband services do not consistently extend to and through the last mile to the actual customer premises.

Hence a continuing need exists for a network architecture and elements thereof that will efficiently provide a combination of broadband services and telephone services, which will enable a carrier to continue to support existing telephone services as well as meet demands for ever greater digital bandwidth for newer broadband applications out to the network edge. A related need exists for such a network to seamlessly support telephone applications, whether for newer customers serviced through the enhanced broadband elements of the network or for customers accessing the network through remaining legacy equipment.

SUMMARY

The embodiments address the above noted problems and needs by providing an enhanced network architecture for carrier service, which supports broadband and voice-grade telephone applications, and by providing enhanced components for implementing such a network architecture.

The network embodiment utilizes three or more layers of fiber optic rings, one layer of which extends to the customer premises. An intelligent soft network interface device forms the point of demarcation between the customer premises media and carrier network. A neighborhood optical fiber ring connects a number of the interfaces to a remote terminal. Several remote terminals in an area in turn communicate via the next higher level ring to a host digital terminal. To provide logically switched services over a relatively wide area, such as a LATA, several of the host digital terminals communicate with each other via a core optical fiber ring, that serves as the third or highest of the three main tiers of the network embodiment.

To control telephone services and provide call set-up signaling, the inventive network will also include a centralized media gateway controller. As disclosed, the remote terminals and preferably the host digital terminals serve as service switching points (SSPs), for at least some intelligent services provided by the network. The media gateway controller will communicate via data links through the network. The media gateway controller (MGC) will provide control information to the various network nodes as appropriate, for example to the soft network interface devices and to the SSPs. The links from the SSPs to the MGC may utilize separate resources but preferably use the same ring or rings that interconnect the SSPs. Signaling communications between the MGC and the other network nodes, particularly the SSPs, utilize permanent virtual circuits through the rings of the network.

An embodiment of the soft network interface device incorporates an optical/electrical interface for communication via the neighborhood optical ring and one or more interfaces to the specific subscriber's customer premises media. The soft network interface device also includes one or more programmable processors, for implementing intelligent control of the flow of communications between the network interface and the interfaces to the customer premises media. The programmable processor(s) implement a micro-gateway functionality, which may be programmed or provisioned, preferably by the carrier for some functions and by the customer for other service related applications.

An initial embodiment of the soft network interface device utilizes a single data processing unit or system, programmed in two logically separate parts, to implement certain carrier-network intelligence as well as the customer's application intelligence. However, the concepts of the soft network interface device also may be implemented as two separate units, where one unit (carrier's unit) comprises the optical/electrical interface and a carrier-side data processing system, and the second unit comprises the interfaces to the specific subscriber's customer premises media and a customer-side data processing system. In the later embodiment, the carrier's unit would provide a standard interface, allowing the customer to purchase and install the second unit having the desired interfaces and applications processing capacity, essentially as an off-the-shelf commodity item.

The embodiment of the MGC runs applications to implement the service control logic of the network, particularly for telephone like services. Applications running on the MGC may access other control data resources, for example, a LIBD database, an SCP service database, etc. The additional database resources may reside on the MGC or on a separate system coupled to the MGC via an appropriate data communication channel.

In at least some applications, a remote terminal also provides traffic and signaling communications to and from a legacy telephone switch. A disclosed embodiment of a remote terminal for such an application comprises a local optical/electrical interface, for optical communications via a fiber ring to and from customer premises. An area-wide optical/electrical interface, typically for coupling to the next higher level ring, enables optical communications via the higher level optical network media, at a rate which is higher than used for communications via the fiber rings to the customer premises. This embodiment of the remote terminal also includes an interface for communication via a link to a legacy telephone switch. A control module controls routing between the interfaces within the remote terminal. The embodiment also includes two different buses in the remote terminal. A high-speed bus is coupled to the optical network interfaces and the control module; and a low-speed bus is coupled to the control module and to the interface for the link to the legacy telephone switch.

Additional objects, advantages and novel features of the embodiments will be set forth in part in the description which follows, and in part will become apparent to those skilled in the art upon examination of the following and the accompanying drawings or may be learned by practice of the embodiments. The objects and advantages of the inventive concepts may be realized and attained by means of the methodologies, instrumentalities and combinations particularly pointed out in the appended claims.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF THE PREFERRED EMBODIMENTS

The various embodiments disclosed herein relate to network architectures and components thereof, for providing carrier grade services, both as a new transport for existing telephone services and for a wide range of higher data-rate services. The embodiments also integrate transport for traffic and signaling to and from legacy systems, such as legacy telephone switches and/or long distance networks.

Figure 1:
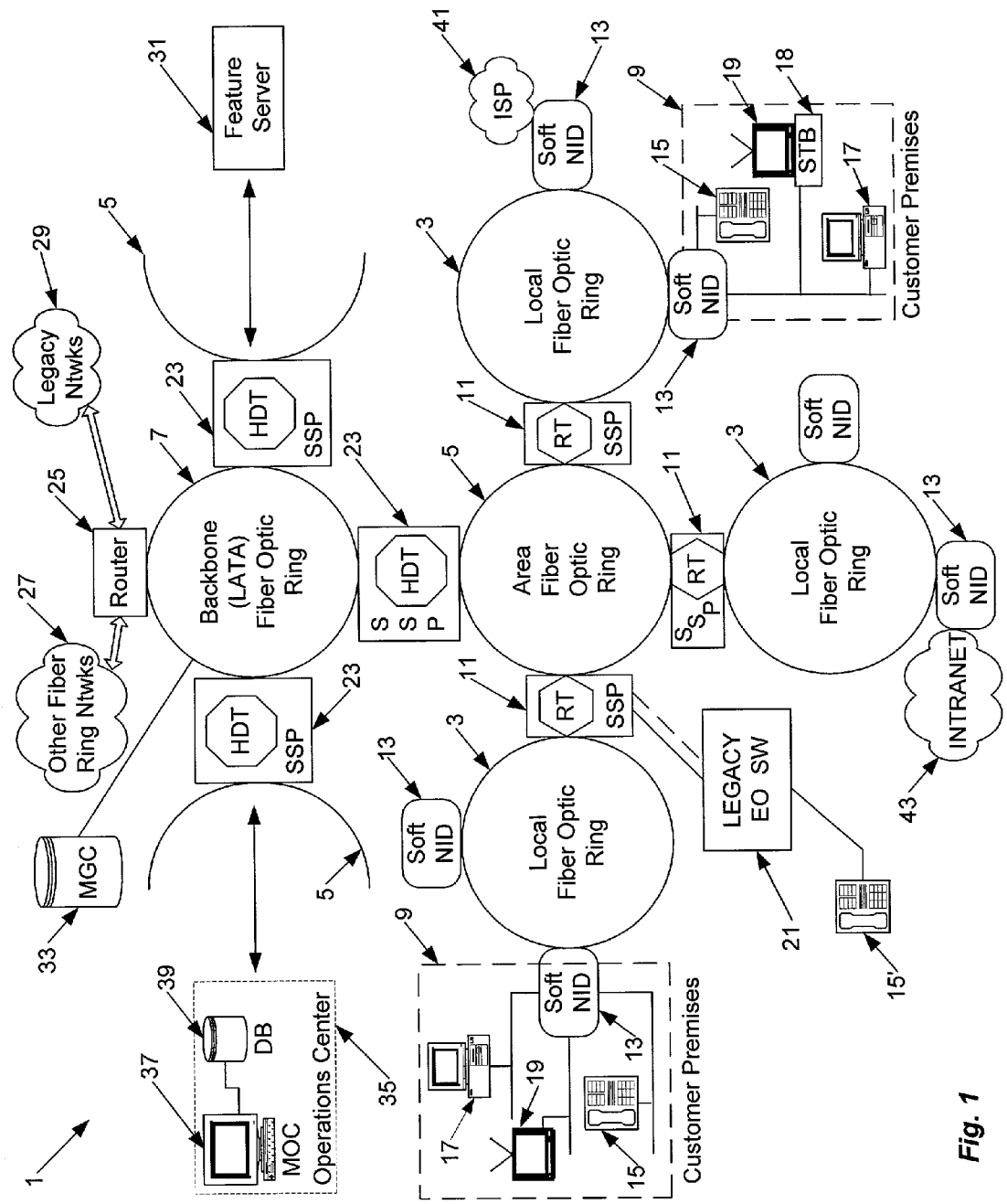
FIG. 1 is a functional block diagram of an embodiment of a multi-ring network architecture.

Reference now is made in detail to the presently preferred embodiments, examples of which are illustrated in the accompanying drawings and discussed below. FIG. 1 shows a simplified architecture for a local carrier's network 1, which utilizes three or more layers of fiber optic rings. The first tier or layer of the network is the multi-subscriber local fiber optic. A local fiber optic ring 3 could serve a single customer premises having a high requirement for bandwidth, for example, a business complex. However, the typical local fiber optic area ring 3 serves a number of residential or business customers within a given neighborhood, and as a result, is sometimes referred to as the "neighborhood ring." The next level is the area-wide fiber optic ring 5, which interconnects a number of number of the local rings 5 in a given area. The area ring 5 also provides communications to and from the next higher regional layer. In a typical local exchange carrier network, the regional backbone ring is a local access transit area (LATA) ring 7.

Several elements of the network are identified using telephone network terminology, such as remote terminals (RTs), host digital terminals (HDTs) and service switching points (SSPs). It should be noted, however, that such elements of the network do not exactly correspond to similarly named components of existing telephone networks. Here, these terms refer to certain intelligent nodes of the advanced network, as will be discussed in more detail below.

The first ring layer 3 extends between the remote terminals (RTs) 11 and the customer premises 9. The edge devices at the customer premises 9 are embodied as soft network interface devices or "soft NIDs" 13. These NIDS 13 are soft in that they incorporate programmable communications control and protocol translation capabilities involved in implementation and delivery of network services. Also, these edge devices implement one or more generic network terminations, facing toward the customer side, at which point it is possible to connect-in any one or more of a number of readily available interface cards or line cards, to provide the physical layer interface to the media within each particular customer's premises.

The soft network interface device (soft NID) 13 at each customer premises 9 terminates the customer premises wiring and provides the interface to the first level ring 3. As such, each NID 13 includes one or more interface cards, supporting two-way communication connections to the media utilized in the particular home or business premises 9. Typically, a soft NID 13 will provide a standard telephone line interface for voice telephone services as well as one or more interfaces for data services on the same or preferably separate in-house wiring. At least one data service provides digital broadband communications capabilities.

Hence, in the illustrated example, the soft NID 13 includes a line card that provides a standard telephone line interface over twisted wire pair to one or more analog telephones or the like 15. Another interface card typically provides a local data connection, such as an Ethernet link over CAT-5 wiring to personal computers or other data devices 17. Another card could provide a separate video link directly to television sets 19 or from video cameras or recorders, using an analog or digital protocol. Alternatively, the television(s) 19 in a customer premises 9 could use the same digital link as the PCs 17. The TV 19 may be compatible with a digital video protocol on the data link, or the subscriber may use a set-top box (STB) decoder 18 to convert the digital video to a signal compatible with the particular type of TV set 19.

The soft NID 13 also includes an optical/electrical interface to the first level fiber optic ring 3. The intelligent processing and routing element, between the customer premises media interface(s) and the optical/electrical interface, essentially controls the NID 13 to operate as a micro-gateway (MG) at the edge of the carrier's network. This gateway functionality essentially provides logical interfaces as well as two-way protocol conversions between the in-house communication protocols on the wiring or other media in the customer premises and the fast packet elements of the network 1. The logical interfaces provided by the MG support the appropriate service logic, for the services and service features offered through the network 1. For voice telephone service, for example, the NID converts between analog and digital formats, implements the desired voice coding and decoding scheme, packetizes and depacketizes the encoded voice information, and performs any necessary address processing. The structure and functionality of an embodiment of the soft NID 13 is discussed in more detailed below, with reference to FIG. 2.

A number of the soft NID type edge devices 13 communicate via the first level optical fiber ring 3 to a remote terminal (RT) 11. Each remote terminal 11 may serve several first level rings 3 providing communications to and from customer premises 9, although the simple example shows only one ring 3 per remote terminal 11.

In the illustrated architecture, the remote terminal 11 functions as a first level intelligent router or switch. Although referred to as an SSP, it should be noted that such a node in the network 1 is not analogous to the TDM based switch typically utilized in the SSPs of the existing telephone network. The RT 11 instead is a packet-switch type router. The SSP capability here is a more generic ability to recognize a trigger, i.e., a need for information or an instruction regarding how to process a customer communication, and communicate with a higher level node having service logic, to obtain the necessary information or instruction. Hence the intelligence of this network routing node 11 includes the added functionality to recognize events and obtain instructions or necessary information from higher level control logic, such that the remote terminal 11 functions as a packet-switch with service switching point (SSP) capabilities.

In the network 1, the RTs 11 are relatively high-capacity devices providing packet-based routing and switching to implement desired voice and data services. However, for at least the telephone type services and preferably for some broad band services, the SSP capable RTs 11 are the points at which much of the actual control of the services is implemented. Such an SSP capable RT may implement some service logic based on its own internal provisioning, but for other services or features the SSP performs the service control in response to instructions from a higher level controller, as discussed more later.

At lease one of the remote terminals (RTs) 11 on a given area ring 5 also provides an interface for connection to legacy telephone type end office (EO) switching systems 21 in the carrier's region of operation. The EO switch 21 provides plain old telephone service (POTS) to analog subscribers and/or ISDN subscribers, shown having telephones 15', as in the existing telephone network. However, the interoffice communications to and from that switch 21 utilize capacity within the fast packet portions of the enhanced network 1.

The links from an RT 11 to an EO switch 21 include standard digital telephone trunk circuits (shown as a solid line) over wire or optical media or the like, and preferably include out-of-band signaling links (shown as a dotted line), for example, a signaling system 7 (SS7) link. From the perspective of the EO switch 21, the RT 11 appears like both another switch (tandem or end office) of the old telephone network and as a signaling transfer point (STP) of the old interoffice signaling network. The RT 11 serves as a media gateway for the legacy traffic to the fast packet portion of the network 1, and the RT 11 interworks and routes the associated signaling traffic.

Several remote terminals 11 in an area in turn communicate via the next higher level ring 5 to a host digital terminal (HDT). For most services, the remote terminals (RTs) 11 perform the service switching point (SSP) functions as outlined above. However, for some types of services, the HDTs 23 also perform SSP functions similar to those implemented by the RTs 11. Like an RT 11, the HDT 23 is a relatively high-capacity router and service switch, which provides packet-based routing and switching to implement desired voice and data services. The logic for HDT handling of most of the services may reside in the HDT 23, or for some services, the SSP functionality may perform the control in response to instructions from a higher level controller, as discussed more later.

To provide logically switched services over a relatively wide area, such as a local access transport area or "LATA," several of the HDTs 23 communicate with each other via the third level optical fiber ring 7. Each of the HDTs 23 will typically communicate through two or more of the intermediate level rings 5 with remote terminals 11, and thus to equipment at a large number of customer locations 9 within the overall service area. Of course, the geographic area encompassed by the network 1 may include any desired physical area serviced by the particular carrier, depending on its business structure and the like. The LATA area may be convenient for local exchange carriers, if the regulatory agencies maintain the current scheme of LATA boundaries for determining when traffic is long distance traffic and must be handed off to an interexchange carrier.

Legacy switches, such as the EO switch 21, may connect into an HDT 23, but typically connect to an RT 11, as discussed above. The structure of the HDT 23 is generally similar to that of the RT 11, except that the switch/router hardware within the HDT is designed for a higher traffic capacity, to support the communications around the backbone ring 7.

The backbone ring 7 also connects to one or more routers 25 that provide communications between the network 1 and other networks. The router 25, for example, routes both customer traffic and signaling to and from optical fiber ring systems 27 in other regions. The same router 25 (or another router) on the backbone ring 7 provides an interface to other telephone networks 29 utilizing legacy technologies, for example, to the point of presence (POP) of a telephone interexchange carrier's network. The interface to telephone-type legacy networks typically will include a time division multiplexed (TDM) digital link for voice traffic, for example via Synchronous Optical NETwork (SONET) or wired IMT trunk circuits. This interface typically will also include an SS7 signaling link, for network signaling communications with the legacy network(s) 29. Hence, the router 29 will include the appropriate interfaces to the legacy links and will provide the appropriate protocol conversions between the legacy protocols and those used by the fast packet elements of the network 1.

To support many of the familiar telephone services as well as some services to be developed in future, the network 1 further includes one or more feature servers 31, one of which appears in the simplified illustration in FIG. 1. In the embodiment, an HDT 23 on the backbone ring 7 connects to the feature server 31, although it is envisaged that the feature server could connect to a local ring 3 through a soft NID 13 or directly to a remote terminal 11. In its simplest form, the feature server provides specialized voice telephone service related processing. For example, the feature server 31 may provide voice recording, speech/voice recognition and/or voice response capabilities and/or conversions between speech and text.

To control telephone services and provide call set-up signaling, the inventive network will also include a centralized media gateway controller. The media gateway controller or "MGC" 33 connects via logical data links through the network 1 to the various SSPs. The MGC 33 responds to queries and provides control information to the various remote terminals (RTs) 11 and/or the HDTs 23, when those nodes function as SSPs during processing of a voice telephone call or other network service. For some service applications, the MGC 33 may also provide control information to the micro-gateways implemented in the soft NIDs 13. The links from the SSPs to the MGC may utilize separate resources, but preferably these logical links use the same rings that interconnects the SSPs. Signaling communications between the MGC and the other network nodes 11 and 21 that serve as SSPs preferably utilize permanent virtual circuits through the rings of the network. Any virtual circuits used to provide communications between the MGC 33 and the soft NIDs 13 are "switched," in that they are set-up through the network as needed and torn down when the signaling is complete.

Physically, the MGC 33 is a general purpose computer system with an appropriate communications interface to the network 1. The MGC 33 runs one or more applications to implement the service control logic of the network, particularly for telephone like services. Applications running on the MGC may access other control data resources, for example, a LIBD database, an SCP service database, etc. The additional database resources may reside on the MGC 33 or on a separate system (not shown) coupled to the MGC 33 via an appropriate data communication channel. In practice, the MGC 33 may be implemented as a redundant pair of systems, both of which run the same service logic software and store the same subscriber specific service control data.

The illustrated network 1 supports telephone services between stations 15 or between a station 15 and a station 15'. The network also supports telephone service for stations 15, 15' to or from long distance carrier networks, whether the other carriers use similar fiber networks 27 or legacy networks 29.

The network 1 also supports a broad range of packet data services, many of which entail broadband communications. The most common examples of data services, particularly as might utilize broadband capabilities of the network 1, include Internet services and private data network services. A typical Internet access service involves a packet data session for a PC 17 or the like extending through the network 1 from the customer's soft NID 13 to a network 41 of an Internet Service Provider ISP. The ISP network may connect to the network 1 at any convenient point. To the local carrier operating network 1, the ISP is simply another customer, in this case, one requiring broadband data service. In the illustrated embodiment, the ISP type customer has a soft NID 13 on a local ring 3. To the network 1, the soft NID 13 of the ISP appears like other soft NIDs, except that the service provisioning associated therewith relates specifically to the data traffic and loading which the ISP requires. The ISP's soft NID 13 may be similar to other soft NIDs, but typically, this soft NID is a router of a particular size so as to enable throughput to the ISP network 41 matching the projected traffic load for the ISPs access services and likely need not include any interface for telephone equipment at the customer premises.

In a similar manner, an Intranet 43 for private network services is essentially another data transport customer of the network 1. Like the ISP network 41, the Intranet connects to a ring 3 through a router type implementation of the soft NID 13. Alternatively, the Intranet 43 could connect to the network 1 directly through an RT 11 or an HDT 23 or even the router 25, but preferably the Intranet 4 connects to the network 1 via a soft NID 13, like any other customer.

Communications on the rings 3, 5 and 7 utilize packet protocols, such as Internet Protocol (IP) and Transmission Control Protocol (TCP). At least in initial embodiments, the physical transport layer will utilize aynchronous transfer mode (ATM) cells transmitted over the optical waves utilized by the actual fibers. The fiber transport of the ATM cells could utilize SONET or other fiber ring protocols.

The International Standards Organization (ISO) Open Systems Interconnection (OSI) reference model specifies a hierarchy of protocol layers and defines the function of each layer in the network. The lowest layer defined by the OSI model is the physical layer (L1). This layer provides transmission of raw data bits over the physical communication channel through the particular network. The layer next to the physical layer is the data link layer (L2). The data link layer transforms the physical layer, which interfaces directly with the channel medium, into a communication link that appears error-free to the next layer above, known as the network layer (L3). The data link layer performs such functions as structuring data into packets or frames, and attaching control information to the packets or frames, such as checksums for error detection, and packet numbers. The network layer provides capabilities required to control connections between end systems through the network, e.g. set-up and tear-down of connections.

An embodiment of the network 1 could utilize SONET and ATM as the L1/L2 protocols. The neighborhood rings 3 might operate at lower SONET rates, e.g. OC-1 or OC-3, whereas the rings 5 and 7 would operate at higher-rate levels of the protocol. Preferably, the network 1 utilizes Internet Protocol, for example, as the L3 network layer protocol.

In the OSI model, a transport layer protocol (L4) runs above the network layer. The transport layer provides control of data transfer between end systems. Above the transport layer, a session layer (L5) is responsible for establishing and managing communication between presentation entities. For example, the session layer determines which entity communicates at a given time and establishes any necessary synchronization between the entities. For at least some applications, the network 1 will often utilize TCP as part of the L4/L5 layers of the protocol stack.

Above the session layer, a presentation layer (L6) serves to represent information transferred between applications in a manner that preserves its meaning (semantics) while resolving differences in the actual representation (syntax). A protocol (L7) that is specific to the actual application that utilizes the information communicated runs at the top of the protocol stack.

In a network utilizing such a protocol stack, virtual circuits can be defined utilizing the ATM cell header information, such as the virtual path identifier (VPI) and the virtual circuit identifier (VCI). Sessions, for data or voice can utilize end-to-end addressing, based on the IP frame addressing data. The TCP port identification, which points to the user application, also can be utilized to distinguish service type and/or destination.

Figure 2:
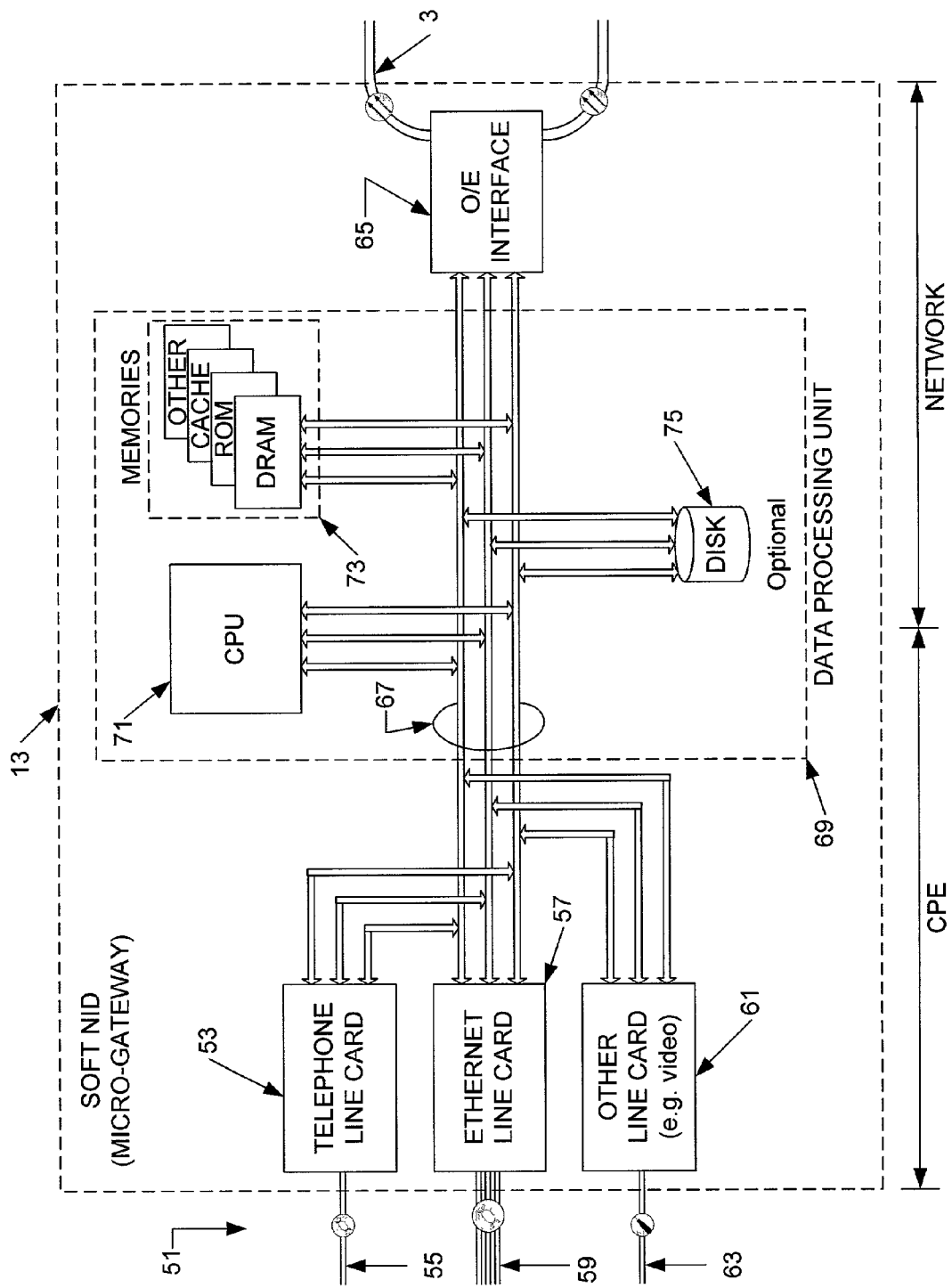
FIG. 2 is a functional block diagram of an exemplary embodiment of a soft network interface device, for use in the network of FIG. 1.

FIG. 2 shows the elements of an exemplary embodiment of a soft network interface device or "soft NID" 13, in block diagram form. This particular implementation is one intended to support a combination of different telephone and data services available via the network. As discussed more below, the example is one appropriate for a residence or small/home business customer, although those skilled in the art will recognize how to scale the concept to service larger volume customers requiring services to more telephone stations and/or higher digital bandwidth for data communication applications.

As noted earlier, the soft network interface device (soft NID) 13 at each customer premises terminates the customer premises wiring and provides the interface to the first level ring 3. To that end, each NID 13 includes one or more interface cards, supporting two-way communication connections to the media 51 utilized in the particular home or business premises.

In the multi-service embodiment of FIG. 2, the soft NID 13 provides a standard telephone line interface for voice telephone services as well as one or more interfaces for data services on the same or preferably separate in-house wiring. Hence, the illustrated soft NID 13 includes a telephone line card 53 that provides a standard telephone line interface over twisted wire pair 55, to one or more telephones 15 as shown in the earlier drawing. The soft NID 13 also includes a data interface card, which in the example is an Ethernet line card 57, for providing two-way Ethernet local area network (LAN) type communications over CAT-5 cable 59 (shown as multiple twisted pairs). The soft NID 13 may include other types of line cards 61, for example, for providing video services over an in-home coaxial cable 63. The customer may have any number of different types and combinations of wired or wireless telephone and broadband communications media within the customer premises, and the customer would select the appropriate set of line cards to interface to those media 51 for the desired service applications.

The soft NID 13 also includes an optical/electrical (O/E) interface 65 to the first level fiber optic ring 3. An internal bus network 67 interconnects the customer premises-side interface cards 53, 57 and 61 and the O/E interface 65, and the bus 67 connects all of those interfaces to elements of an internal data processing system 69. The interface 65 conforms to the physical layer protocols required by the neighborhood optical ring 3. On the internal side, however, the O/E interface 65 conforms to the electrical signaling protocols utilized on the bus network 67 and by the other elements of the soft NID 13.

The optical rings in the network 1 provide fast packet transport for all communications through the ring, for example, including the voice telephone service and all broadband services. The packet functions may be performed in the O/E interface 65 or in the line cards.

As noted, the illustrated soft NID 13 includes a telephone line card 53 that provides a standard telephone line interface over twisted wire pair 55, to one or more telephones as shown in the earlier drawing. The line card may provide ISDN type digital service. The media for the telephones could utilize wireless links, power lines, or other in-home media. However, for many customers, the line card 53 provides analog-type plain old telephone service over the twisted pair wiring 53 to existing standard telephone equipment, as illustrated in the drawings.

For an analog type plain old telephone service (POTS), the line card 53 provides two-way conversion between analog and digital signals. The POTS line card 53 also provides normal telephone line functions, such as battery feed, over-voltage protection, ringing, signaling, coding, hybrid and testing (commonly collectively identified as the 'BORSCHT' functions, in the telephone industry).

The hybrid functionality of the telephone line card 53 performs a two wire to four wire type conversion. The line card 53 sends and receives analog signals over a twisted wire pair 55, and the telephone line card 53 sends and receives digital signals through the bus 67 and the network rings. More specifically, in the upstream direction, the telephone line card 53 receives analog signals from the associated twisted wire pair 55. The line card 53 converts those signals into digital signals in a format compatible with the bus network 67 and the fast packet communications utilized by the network 1. The telephone line card 53 supplies the digitized audio information signals through the bus 67 to the O/E interface 65, for upstream transmission through the fiber ring 3 to the RT 11 serving the particular ring. In the downstream direction, the O/E interface 65 supplies voice telephone information received from the ring 3 over the bus network 67 to the telephone line card 53. The line card 53 in turn converts the downstream digitized information signals to analog form and couples the resultant analog signals to the twisted wire pair for two-wire transport to the customer premise equipment.

An ISDN implementation of the line card 53 would perform functions similar to those described above for the analog version of the telephone line card 53, except that the signals provided on the relevant customer wiring 55 would conform to ISDN standards. In the example, the telephone line card 53 provided a single telephone interface to one customer premises line 55. This may be typical for residential installations. However, high-end residential users and businesses will require increasing numbers of telephone lines. It is envisaged that different versions of a telephone line card 53 may support 1, 2, 14, 12, 24 or 32 customer premises telephone lines in either POTS analog form or digital ISDN form. For business applications requiring still more lines, the soft NID 13 would include multiple telephone line cards 53 to provide an aggregate telephone line capacity to meet the needs of the particular business customer.

In the preferred embodiments, a second interface card provides a local data connection. The subscriber may choose any conveniently available data interface, such as Home Phoneline Networking Association (HomePNA), IEEE 802.11 wireless LAN, or other home networking protocols and media. In the illustrated embodiment, the data interface is an Ethernet line card 57 for data communication over CAT-5 wiring 59. For a typical residential application, the Ethernet card 57 would provide 10baseT data communication within the customer premises. However, other users, particularly business users, may opt for 100baseT or even gigabit Ethernet type local area network operations. The line card 57, the bus 67 and the O/E interface 65 essentially provide two-way interworking between the data protocols on the customer premises wiring 59 and the neighborhood fiber ring 3. To the in-home network, the soft-NID 13 appears as another device on the LAN, albeit providing access to the broader area services available via the network 1.

As noted above, the soft NID 13 may include one or more additional line cards 61, to support other types of communications within the premises 9 and provide interfacing thereof to the network 1 via the ring 3. The additional line cards are selectable at the option of the owner of the particular customer premises. Examples include X10, which is a communications protocol for remote control of electrical devices and communications over standard household AC power-line wiring, and IEEE 1394, which is a serial interface for short-range, low-data-rate, infrared communications between entertainment and computer devices. In the example shown, the soft NID 13 includes a line card 61 for video communications over coaxial wiring 63. The video line card 61 may provide analog or digital programming to television equipment for recording and/or presentation to a user. Alternatively, the line card may accept analog or digital video communication for upstream transmission through the soft NID 13 and the network 1.

The soft NID 13 is an intelligent processing and routing device. To implement the control logic for these functions, the NID 13 includes a data processing system 69 coupled to the bus 67. The exemplary data processing system 69 comprises elements of a general purpose computer programmed to control the interfaces and communications over the bus 67 in such a manner that the NID 13 operates as a micro-gateway at the edge of the carrier's network 1.

In the embodiment, the data processing system 69 contains a central processing unit (CPU) 71 and memories 73 connected to the bus 67. The CPU 71 may contain a single microprocessor, or may contain a plurality of microprocessors for configuring the data processing system 69 as a multi-processor system. The memories 73 serve as the main memory and program storage for the CPU 71. The memories 73 typically include dynamic random access memory (DRAM), a read only memory (ROM) and high-speed cache memory. The memories 73 may include other types of devices, such as an electrically erasable programmable read only memory (EEPROM), flash memory and the like. Optionally, the data processing system may include a hard disk drive 75 or other mass storage device, such as a CD or DVD drive, a floppy disk drive, tape drive, etc.

In operation, the main memories 73 and/or the hard disk 75 store at least portions of instructions and data for execution by the CPU 71 as well as associated working data. The instructions and data include various address tables and other routing data needed to interwork the in-home communications to the transport protocols utilized in the network 1 as well as some service provisioning data. The stored information may also include instructions and data relating to applications and services controlled by the user.

The data processing system 69 is programmable in response to digital communications received via the ring 3, for example from the database 39 or from a terminal such as the MOC 37. Typically, one (or more) of these carrier systems downloads service provisioning data to the soft NID 13, to enable the NID to provide specific network services and related features, which the customer purchases from the carrier. Such data also may be downloaded from other carriers or service providers, such as a long distance carrier or an ISP. The data processing system 69 also is programmable in response to communications received via the customer premises media 51 and the bus 67, for example from a telephone 15 and/or a computer 17 in the customer premises 9 (see FIG. 1). Initial and/or diagnostic programming may be performed via a local port or removable storage media drive (not shown), such as a drive for a floppy disk, a compact disc read only memory (CD-ROM), or an integrated circuit non-volatile memory adapter (i.e. PC-MCIA adapter).

The data processing system 69 also learns as it provides communications through the network 1. For example, if the user calls a particular destination for voice or data communications, and the network downloads information needed to establish the session link through the network, the data processing system 69 stores the information for future use, for example, in case the user calls the same destination again.

As noted, the soft NID 13 essentially is the edge of the carrier's network. The device connects to the network 1 via the neighborhood ring 3 and provides the interfaces to the media 51 within the customer premises. Some micro-gateway functions of the soft NID 13 are programmable by the carrier, typically via data communications carried through the network and some of the service control logic of that gateway function is responsive to instructions from other nodes of the network 1. The micro-gateway functionality, however, is responsive to user input, for example, to initiate a call or selected session through the network 1. Also, some functions of the soft NID 13 are programmable by the user. Hence, the line of demarcation between the network 1 and customer premises may be viewed as bisecting the soft NID 13. Logically, the soft NID 13 may be thought of as partially a customer's device, that is to say as customer premises equipment (CPE), and partially a network device. Stated another way, the customer-side interfaces 53, 57 and 63 and a portion of the logic implemented by the data processing unit 69 are part of the customer premises equipment. However, the O/E interface 65 and a portion of the logic implemented by the data processing unit 69 are part of the neighborhood ring 3 on the carrier's network 1.

It may be helpful to briefly consider two examples relating to the programmability of the soft NID 13 in somewhat more detail. For local telephone services, the carrier may download provisioning data and/or programming to support certain features, such as three-way calling, into the soft-NID 13. In preferred embodiments, this programming information comes through the network 1, for example, from one or more of the carrier's systems in the operations center 35.

For long distance telephone service, however, the local carrier treats the communications as a simple pass-through. For the long distance service, the soft NID 13 only needs the routing or addressing data to reach the point of presence (POP) of the long distance carrier of choice, for example, into one of the legacy networks 29. When the soft NID 13 detects a 1+dialing pattern on the telephone line, the NID uses the POP addressing data to initiate a link through the network 1 to the POP of the long distance carrier. Although the local carrier may download this data in the same manner as for local call provisioning and service features, preferably the addressing data to reach the POP is provided through the network 1, by the long distance carrier, for example, in response to an on-line subscription to services of that carrier. Alternatively, such data could be programmed into the soft NID 13 from a data device, such as a PC 17, at the customer premises 9.

To support the various programming options, the data processing unit implements certain access restrictions using appropriate levels of security protocols. For example, only the carrier's systems may program basic service provisioning data into the soft NID 13. Other features, such as speed dial lists are programmable by the user, and other service data like the PIC code and/or POP address, is programmable by the user or a recognized third party (e.g., the long distance carrier of choice.)

The embodiment of FIG. 2 is of course a representative example only. Those skilled in the art will recognize that the soft NID 13 may take other physical forms. For example, for high traffic applications, the soft NID 13 may take the form of a router or packet switch. As another alternative, the concepts of the soft network interface device may be implemented as two separate units, where one unit (carrier's unit) comprises the optical/electrical interface 65 and a carrier-side data processing system. In this type of embodiment, the second part of the soft NID comprises the interfaces 53, 57 and 61 to the specific subscriber's customer premises media 51 and a customer-side data processing system. The carrier's unit would provide a standard interface, allowing the customer to purchase and install a version of the second unit having the desired interfaces and applications processing capacity, essentially as an off-the-shelf commodity item.

As outlined above, communications on the ring 3 utilize fast packet technologies, for example TCP/IP on top of appropriate transport layers, such as ATM and SONET. The optical ring 3 may utilize other transport protocols, for example Ethernet over fiber as outlined by Sistanizadeh. In a multi-layer ring network 1, communications between some customers remain within the area of ring 3. Initial set-up of such a call or data session may entail control through the remote terminal 11 and higher network elements to provide the necessary address data to the soft NIDs 13 serving the particular customers. However, once the necessary address data is provided to the soft NIDs 13 (and cached therein for at least some services), the soft NIDs 13 simply transmit the packets around the ring to each other. Specifically, the NID 13 sending a packet inserts the destination address, and the NID 13 intended as the recipient recognizes that address in the packet as the packet flows around the ring 3 and captures the packet for further processing at the destination premises 9.

The coding and decoding (CODEC) equipment in the soft NIDs 13, typically in the telephone line cards 53, can implement one or more standard audio encoding schemes. Preferably, the algorithm and its coding parameters are selectable in response to instructions/commands exchanged via the network, to enable the line cards 53 to encode audio information in different formats, and in particular, at different rates. For example, for a telephone call going to or from a legacy long distance network 29 or a legacy end office switch 21, the line card 53 can selectively process audio information into and out of the standard 56 kb/s PCM utilized by such legacy systems, although the soft NID 13 and the rings transport that information between the customer premises 9 and the node coupled to legacy equipment 21 or 29 in fast packet form. Alternatively, the encoding for communication of the audio information through the rings may utilize a lower rate encoding, in which case the RT 11 or router 25 coupled to the legacy equipment would transcode the audio data to and from the format used by the legacy equipment.

For a voice-grade telephone communication between customers using soft NIDs 13, the CODECs perform compression of the digitized audio information, and the carrier may control the encoding rate, for example, in response to network loading. In this manner, the carrier can effectively throttle down voice traffic by reducing the data rates of calls through congested portions of the network 1. The carrier may implement the rate control on a per call basis, by providing instructions at the start of each call; or the carrier may control the rate dynamically during each call by providing instructions to the soft NIDs 13 from time to time as changes if any are needed. The compression and rate control for the telephone services reduces the loading each call places on the network 1.

The lower layer protocols (typically layers 1 to 4 or 5) on the rings are the same on all of the rings, except that each higher level ring typically carries more traffic and therefore operates at a higher rate. The rings 3 will typically operate at the same rate, although one or more of those rings may operate at a higher rate if the traffic in the neighborhood warrants the higher rate. Similarly, the rings 5 will typically operate at the same rate, which is higher than the rate(s) on the rings 3. Again, one or more of the rings 5 may operate at a higher rate than other similar level rings 5, if the traffic in a particular area warrants the higher rate. The backbone ring 7 aggregates traffic from a number of the rings 5 and operates at the highest rate.

The remote terminals 13 and the host digital terminals 23 may be implemented by routers having the appropriate throughput capacities and the appropriate interfaces for the rings 3, 5 and 7. Otherwise, the remote terminals 13 and the host digital terminals 23 are generally similar, with one exception. In the illustrated network embodiment, one or more of the remote terminals 11 includes additional interfacing elements to provide voice grade traffic and associated interoffice signaling communications to and from one or more legacy end office switches 21.

Existing routers with appropriate interfaces may be used and programmed to serve as the remote terminals (RTs) 11 and the host digital terminals (HDTs) 23. The inventors propose an advantageous implementation, particularly for use as a remote terminal 11 that services a legacy switch 21, and that implementation will be described with reference to FIG. 3.

Figure 3:
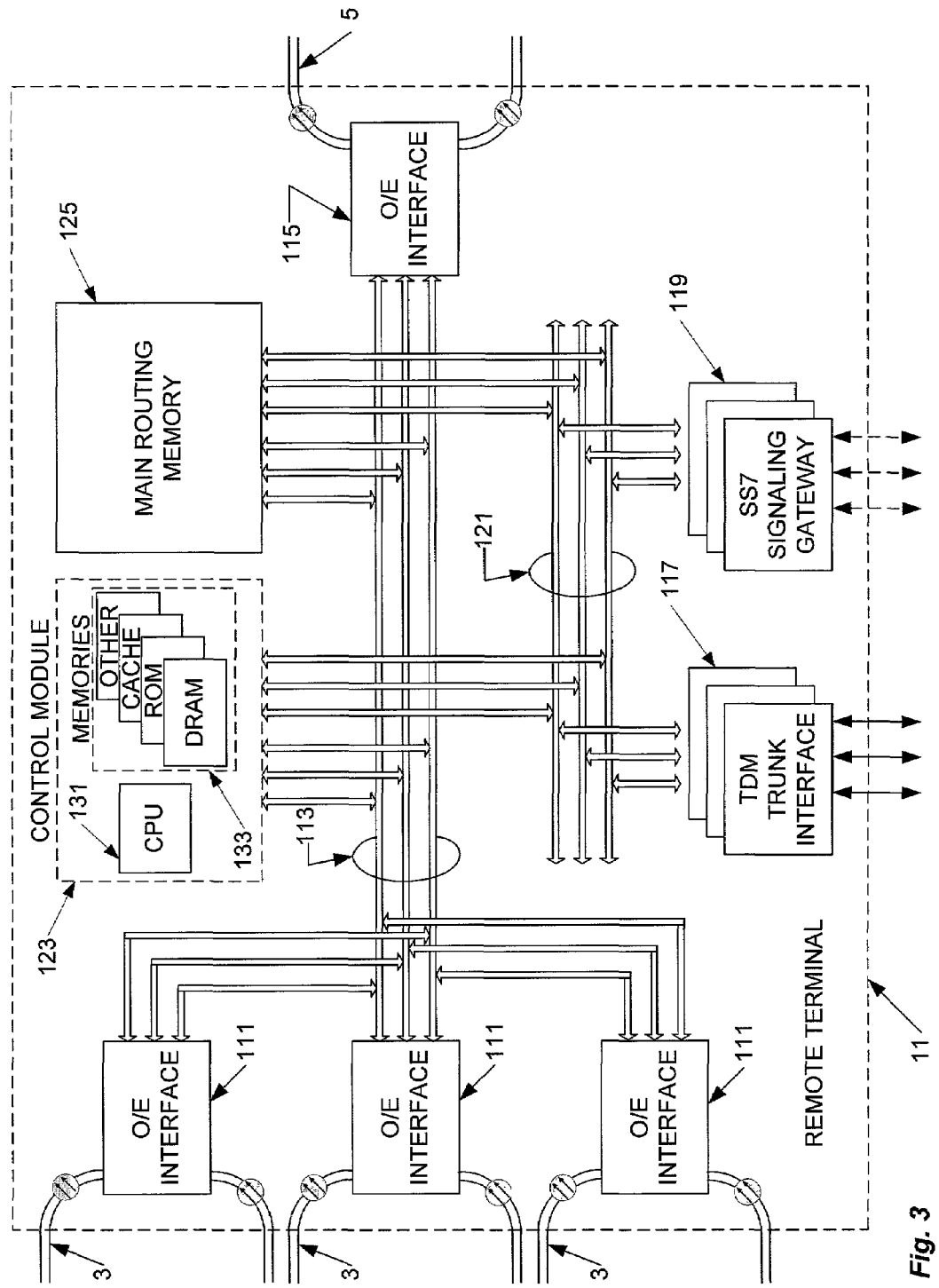
FIG. 3 is a functional block diagram of an embodiment of a remote terminal for use in the network of FIG. 1.

The remote terminal (RT) 11 shown in FIG. 3 is an intelligent packet router specifically adapted to interface between different layers 3 and 5 of the rings as well as to provide interworking communication to and from one or more legacy end office switches 21. As discussed more below, the RT 11 in this embodiment includes the appropriate optical/electrical interfaces, interfaces to trunk and signaling circuits to/from the legacy switch(es) 21 and two different internal bus systems. A high speed bus carries the high-speed packet data to and from the various optical electrical interfaces. The second bus is a low-speed bus for transport of telephone service related data (e.g. voice and signaling) at speeds to/from the interfaces and gateways that convert to and from the legacy formats compatible with the switch(es) 21.

Hence, the illustrated remote terminal (RT) 11 includes one or more optical/electrical (O/E) interfaces 111 to one or more of the first level fiber optic rings 3. On the fiber side, these interfaces process optical signals at the speeds and in the protocols used on the first level fiber optic rings 3. The interfaces 111 provide two-way conversions of the signal speeds and formats on the ring 3 to/from the electrical signal format and speeds used on the high speed internal bus network 113. The RT 11 also includes another optical/ electrical (O/E) interface 115 coupled to the high speed internal bus network 113. The O/E interface 115 provides two-way conversions of the electrical signal format and speeds used on the high speed internal bus network 113 to/from optical signals at the speeds and in the protocols used on the second level fiber optic ring 5. The interface 115 is generally similar to the interfaces 111 except that the interface 115 is adapted to the higher rate form of the optical signals and protocols used on the ring 5.

The exemplary RT 11 also includes two types of interfaces 117 and 119 specifically adapted for communications with one or more legacy switches 21. As shown, the RT 11 includes one or more TDM type trunk interfaces, for example, for connection to electrical or optical inter-machine trunk (IMT) circuits for transporting telephone call type traffic to and from a legacy switch 21. Signaling could use in-band communications. However, it is preferred that RT 11 also includes one or more SS7 signaling gateways 119. The signaling gateways 119 convert between the SS7 signaling protocol used by legacy switches 21 and the fast packet protocols used on the internal buses and on the rings of the network. To provide sufficient traffic capacity, the RT 11 will typically include interfaces 117 to a number of the trunk circuits and gateways 119 to a number of the signaling links for each of the legacy switches served via the particular RT 11. Within the RT 11, the interfaces 117 and the gateways 119 connect to the low-speed bus 121. Of course, it is possible to combine the functions of a number of the trunk interfaces 117 into one multi-port unit, to combine a number of the signaling gateways 119, or to provide a single unit performing both the interface and gateway functions.

The RT 11 includes a programmable, processor-based control module 123 and a main memory 125 for use in execution of the routing functions. The high-speed bus network 113 interconnects the O/E interfaces 111 and 115, and the bus 113 connects all of those interfaces to elements of the control module 123 and the main routing memory 125. The low-speed bus network 121 interconnects the trunk interfaces 117 and the signaling gateways 119 to the elements of the control module 123 and the main routing memory 125.

For discussion purposes, the routing memory 125 is shown as a single distinct storage element of the RT 11. Those skilled in the art will recognize that the functions of this memory may be implemented in a variety of other ways as well. For example, a portion of the main memory of the control module 123 may serve as the routing memory 125. As another option, the memory 125 may comprise a number of individual memories built into the various interfaces, although there may still be a small separate part and/or a part of the memory 125 in the control module 123. In this later case, the distributed memory elements together perform the functions of the routing memory 125.

The RT 11 is an intelligent switching and routing device. The intelligence to implement the control logic of the RT 11 resides in the programmable control module 123. The exemplary data processing system that serves as the control module 123 comprises elements of a general purpose computer programmed to control the interfaces and communications over the buses 113, 121 in such a manner that the RT 11 performs the routing between the rings and the routing to and/from the traffic and signaling links for the legacy switch(es).

In the embodiment, the control module 125 contains a central processing unit (CPU) 131 and memories 133 connected to the buses 113 and 121. The CPU 131 may contain a single microprocessor, or may contain a plurality of microprocessors for configuring the control module 123 as a multi-processor system. The memories 133 serve as the working memory and program storage for the CPU 131. The memories 133 typically include dynamic random access memory (DRAM), a read only memory (ROM) and high-speed cache memory. The memories 133 may include other types of devices, such as an electrically erasable programmable read only memory (EEPROM), flash memory and the like and/or one or more hard disk drives or other mass storage device (not shown). Some implementations will include back-ups for the control module 123 and possibly for the routing memory 125.

In operation, the main memories 133 store at least portions of instructions and data for execution by the CPU 131 as well as associated working data. The instructions and data include various address tables and other routing data needed to control the routing and signaling functions of the RT 11, as well as service provisioning data related to individual customer services and service features. The stored information typically is downloaded from a system of the network carrier through channels through the network 1, for example from the MOC 37 or the database 39 in the operations center 35.

For most simple routing functions, for example, upstream from one O/E interface 111 to another O/E interface 115, the control module 123 controls write-in and read-out operations to and from the main routing memory 125. For an incoming packet, for example, a receiving interface such as 111 transmits the packet through the high speed bus 113 to the memory 125 where it is written into a designated location. Based on the header information, the control module 123 identifies the appropriate output port, that is to say via the O/E interface 115 in our example, and notifies that unit to read the packet from the memory 125 via the high speed bus 113. Upon receiving the packet from the memory 125, the O/E interface 115 sends the packet over the ring 5 coupled to that interface. Similar operations route packets going downstream from interface 115 to one or more of the interfaces 111 and route packets between interfaces 111.

Packets written to the memory 125 via one bus 113 or 121 may be output via the other bus 121 or 113, in order to route communications between the high-speed elements and the elements of the RT 11 on the low-speed bus 121. For example, to communicate audio telephone information coming from a caller on the fast packet part of the network to a called party serviced through a legacy switch 21, the incoming data packet arrives via one of the O/E interfaces 111 or 115, and the interface sends the packet over the bus 113 to the memory. The packet is written into an appropriate location as directed by the control module 123. The control module 123 then instructs the appropriate TDM trunk interface 117 linked to the legacy switch 21 serving the called party to read the packet from the location in memory 125, via the low-speed bus 121. The interface 117 converts telephone audio information in the packet to the TDM format used by the office 21 and sends that audio information over a TO channel on the link to that switch 21. The RT 11 implements a similar process, substantially in reverse, for telephone data from the legacy end office switch 21 intended for transport to a customer served via the fast packet communications on the network rings. Signaling data generated in the RT 11 or in other nodes of the network is transferred to and from the gateways 119 via the busses 113 and 121 and the memory 125, in the same fashion.

The control module 123 also processes packets as necessary to perform any translations required by particular network services. For example, the control module 123 may recognize a particular packet as a call request type signaling packet essentially addressed to the RT 11. In response, the control module 123 analyzes the information in the packet, such as the source identifier and the dialed digits, and determines how to respond to the request. For example, the control module 123 may send queries through the network to the MGC 33 or the like and receive responsive instructions and then process the call based on those instructions, as will be described in more detail later.

The HDTs 23 may utilize a structure similar to that of the exemplary RT 11, but with interfaces and internal capacities adapted to handle communications across a number of area rings 5 and the backbone ring 7. However, in most implementations of the network, the HDTs 23 will not directly service any legacy switches 21, and as a result do not need to incorporate the low speed bus and associated interfaces for the legacy switches. Hence, in most deployments, the HDTs 23 will utilize a standard router design having the appropriate optical ring interfaces and the capacity to switch and route traffic of the appropriate levels.

A number of devices shown in the network diagram (FIG. 1) may be implemented on general purpose computers controlled by software programming. These include, for example, the MGC 33, the feature server 31, the MOC 37, the platform implementing the provisioning database 39 if separate, and the user data devices 17 such as PCs. Although those familiar with data processing and telecommunications arts will generally be familiar with such computers and their associated software, it may be helpful to summarize the structural and functional aspects thereof as they might relate to various embodiments of the network of FIG. 1.

Figure 4:
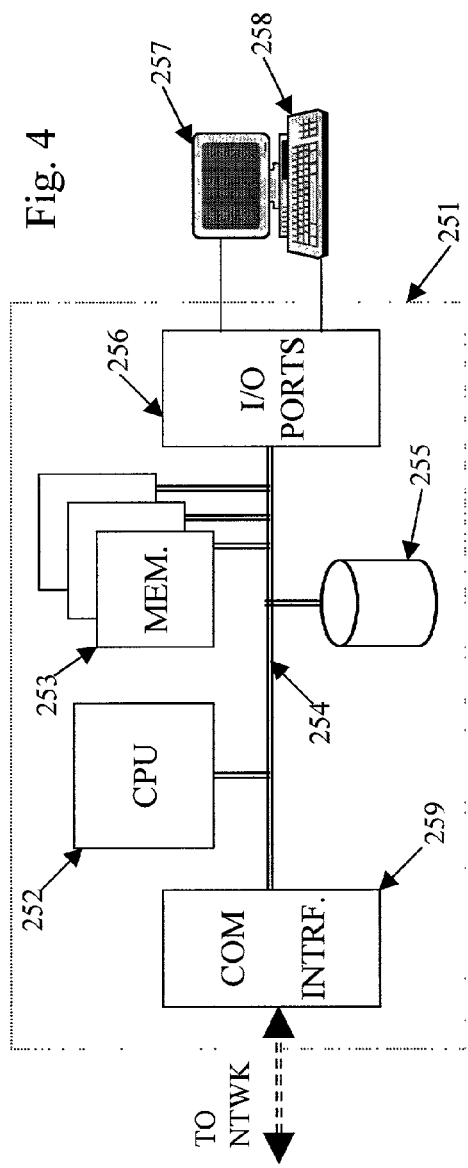
FIG. 4 is a functional block diagram of a personal computer or workstation, which may serve as any one of several of the devices in the network of FIG. 1.

FIG. 4 is a functional block diagram of a PC or workstation type implementation of a system 251. The system 251 may be a customer's device, such as one of the data devices 17. However, for purposes of the inventive network operations, a system such as 251 will operate as a network computer, for example as the MOC 37, or possibly the feature server 31 or the MGC 33.

The exemplary computer system 251 contains a central processing unit (CPU) 252, memories 253 and an interconnect bus 254. The CPU 252 may contain a single microprocessor, or may contain a plurality of microprocessors for configuring the computer system 252 as a multi-processor system. The memories 253 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 252.

The mass storage may include one or more magnetic disk or tape drives or optical disk drives, for storing data and instructions for use by CPU 252. For a PC type implementation, for example, at least one mass storage system 255 in the form of a disk drive or tape drive, stores the operating system and application software as well as data. The mass storage 255 within the computer system 251 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 251.

The system 251 also includes one or more input/output interfaces for communications, shown by way of example as an interface 259 for data communications via the network 1. The interface 259 may be a modem, an Ethernet card or any other appropriate data communications device. The physical communication links may be optical, wired, or wireless (e.g., via satellite or cellular network). For example, if located on a premises connected to a soft NID 13, whether at a customer premises 9 or at a premises specifically set-up as the Operations Center 35, this interface 259 can be any interface card that is compatible with the data link implemented within the particular premises, for example a simple local area network to a soft NID 13 or other network interface device. Alternatively, if the system 251 connects directly to an HDT, for example if the Operations Center 35 or the MGC 33 is co-located with an HDT 23, then the interface 259 would be compatible with the particular packet data link available from the router implementing the particular HDT.

The computer system 251 may further include appropriate input/output ports 256 for interconnection with a display 257 and a keyboard 258 serving as the respective user interface. For example, the computer may include a graphics subsystem to drive the output display 257. The output display 257 may include a cathode ray tube (CRT) display or liquid crystal display (LCD). Although not shown, the PC type system typically would include a port for connection to a printer. The input control devices for such an implementation of the system 251 would include the keyboard 258 for inputting alphanumeric and other key information. The input control devices for the system may further include a cursor control device (not shown), such as a mouse, a trackball, stylus, or cursor direction keys. The links of the peripherals 257, 258 to the system 251 may be wired connections or use wireless communications.

Each computer system 251 runs a variety of applications programs and stores data, enabling one or more interactions via the user interface, provided through elements such as 257 and 258, and/or over the network 1 to implement the desired processing. The MOC 37, for example, runs one or more programs for network monitoring functions and/or service provisioning functions, and the MOC may run a general purpose browser application and/or a separate e-mail program, for normal business of the carrier's employees.

Figure 5:
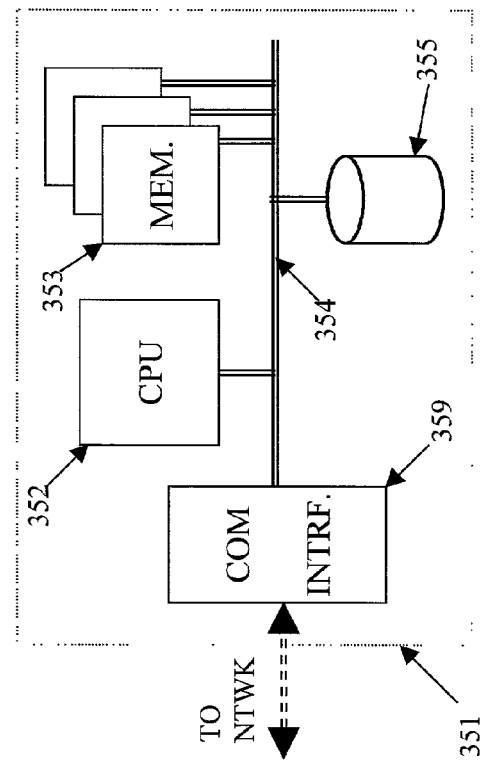
FIG. 5 is a functional block diagram of a server or host computer, which may serve as any one of several of the devices in the network of FIG. 1.

FIG. 5 is a functional block diagram of a general purpose computer system 351 implemented as a server or the like, which may perform the functions of the MGC 33 or the feature server 31. The exemplary computer system 351 contains a central processing unit (CPU) 352, memories 353 and an interconnect bus 354. The CPU 352 may contain a single microprocessor, or may contain a plurality of microprocessors for configuring the computer system 352 as a multi-processor system. The memories 353 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 352.

The mass storage may include one or more magnetic disk or tape drives or optical disk drives, for storing data and instructions for use by CPU 352. If used at the operations center 39, at least one mass storage system 355, preferably in the form of a disk drive or tape drive, stores the provisioning database 39. The mass storage 355 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 351.

The system 351 also includes one or more input/output interfaces for communications, shown by way of example as an interface 359 for data communications via the network 1. The interface 359 may be, an Ethernet card or any other appropriate data communications device providing a local link to an interface on the network 1. The local physical communication links may be optical, wired, or wireless (e.g., via satellite or cellular network). For example, if connected to a soft NID 13, whether at a premises selected as the location for the MGC 33 or the feature server 31, this interface 359 can be any interface card that is compatible with the data link implemented within the particular premises, for example a simple local area network. Alternatively, if the system 351 connects directly to an HDT 23, for example if the feature server 31 or the MGC 33 is co-located with an HDT 23, then the interface 359 would be compatible with the particular packet data link available from the router implementing the particular HDT.

The computer system 351 runs a variety of applications programs and may store a database of control logic for either the MGC or the feature server functions. Although not shown, the system 351 may further include appropriate input/output ports for interconnection with a local display and a keyboard or the like serving as a local user interface for programming purposes. Alternatively, the carrier's operations personnel may interact with the system 351 for control and programming of the system from remote MOC 37 or other terminal device, via a secure link through the network 1 or some other appropriate network.

The components contained in the computer systems 251 and 351 are those typically found in general purpose computer systems used as servers, workstations, personal computers, network terminals, and the like. In fact, these components are intended to represent a broad category of such computer components that are well known in the art.

The inventive concepts relate to networks having the multi-tiered ring architecture and to methods and systems for implementing a wide range of telecommunications services through such a network. Certain aspects of the invention relate to the software elements, such as the executable code and database for the service control logic, which is implemented in the MGC 33 and other nodes of the network, including the RTs 11, the HDTs 23 and the feature server 31. Other inventive concepts relate to programming or software for application in the soft NIDs 13.

A software product includes at least one machine-readable medium and information carried by the medium. The information carried by the medium may be executable code, one or more databases and/or information regarding the services or service control logic.

A computer readable medium, as used herein, may be any physical element or carrier wave, which can bear instructions or code for performing a sequence of steps in a machine-readable form or associated data. Examples of physical forms of such media include floppy disks, flexible disks, hard disks, magnetic tape, any other magnetic medium, a CD-ROM, any other optical medium, a RAM, a ROM, a PROM, an EPROM, a FLASH-EPROM, any other memory chip or cartridge, as well as media bearing the software in a scannable format. A carrier wave type of medium is any type of signal that may carry digital information representative of the data or the instructions or code for performing the sequence of steps. Such a carrier wave may be received via a wireline or fiber-optic network, via a modem, or as a radio-frequency or infrared signal, or any other type of signal which a computer or the like may receive and decode.

At different times all or portions of the executable code or data for any or all of these software elements may reside in physical media or be carried by electromagnetic media or be transported via a variety of different media to program the particular system. Physical media include the memory of the computer processing systems 251, 351 or those of the soft NIDs 13, the remote terminals 11, the HDTs 21, the feature server 31 or the MGC 33. Examples of such physical media include various semiconductor memories, tape drives, disc drives and the like of general-purpose computer systems. All or portions of the software may at times be communicated through the network 1, through the Internet and/or various other telecommunication networks to load appropriate software into the appropriate node or system, for example to program service logic and/or to provision a network node to implement a service or feature for a particular customer. Thus, another type of media that may bear the software elements includes optical, electrical and electromagnetic waves, such as used across physical interfaces between local devices, through wired and optical landline networks and over various air-links.

As used herein, the term "computer-readable medium" therefore refers to any medium that participates in providing instructions to a processor for execution. Such a medium may take many forms, including but not limited to, non-volatile media, volatile media, and transmission media. Non-volatile media include, for example, optical or magnetic disks, such as any of the storage devices in the devices of FIGS. 4 and 5. Volatile media include dynamic memory, such as main memory. Transmission media include coaxial cables; copper wire and fiber optics, including the wires that comprise a bus within a computer system. Transmission media can also take the form of electric or electromagnetic signals, or acoustic or light waves such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, or any other medium from which a computer can read. Various forms of computer readable media may be involved in carrying one or more sequences of one or more instructions to a processor for execution.

Figure 6:
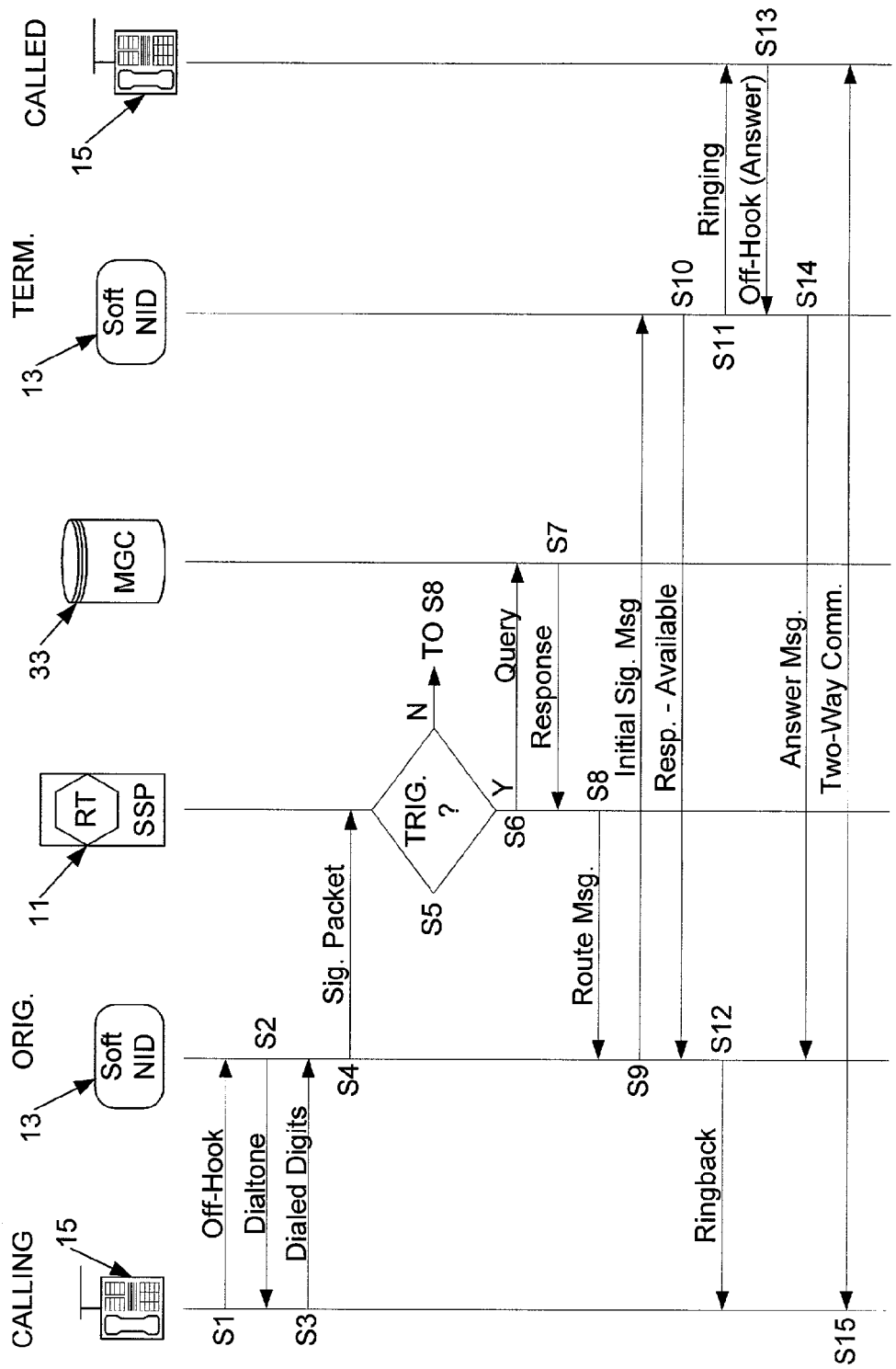
FIG. 6 is a simplified signal flow diagram, useful in explaining the processing of a simple telephone service call through the network of FIG. 1.

It may be helpful, to consider an example of a simple call flow process, as it might relate to a telephone communication through the network 1. FIG. 6 is a signal flow diagram that may be useful in understanding the processing of such a call.

For discussion purposes, assume that a user initiates a call (step S1) from one of the analog telephone stations 15 by taking the handset of the station off-hook. The telephone line card 53 in the calling customer's soft NID 13 (originating) detects the off-hook condition on the customer premises wiring 55 and transmits a dialtone signal over the wiring 55 to the station 15 (S2). Upon hearing the dialtone, the user dials the destination digits, for example, by pushing the appropriate sequence of keys on the telephone keypad. In most situations, the telephone 15 will transmit dual tone multi-frequency signals over the wiring 55 to the line card 53 (S3). The telephone line card 53 decodes these tone signals to identify the dialed digits.

For at least the necessary signaling functions, the originating soft NID 13 will have a 'nailed-up' address for a link through the ring 3 to the serving remote terminal RT 11. This nailed-up link may be an assigned virtual circuit defined at the ATM level, if the ring 3 uses ATM, and/or the signaling with the RT 11 may utilize an IP address and TCP port identifier assigned to call-set up signaling applications between the soft NID 13 and the RT 11. The elements of the soft NID 13 formulate a packet and possibly ATM cells containing segregated portions thereof, with dialed digits and the appropriate addressing information; and the O/E interface 65 transmits that packet from the originating soft NID 13 through the ring 3 to the serving RT 11 (S4).

Most addressing functions of the soft NID 13 are controlled by the CPU 71. However, for call set-up using a nailed up link to the RT 11, the necessary link information may be permanently stored in (burned into) the hardware of the telephone line card 53 and/or the O/E interface 65, eliminating the need for CPU intervention.

When the RT 11 receives the dialed digits, it identifies the originating soft NID 13 from the link and/or addressing information contained in the packet. The dialed digit and source information are internally routed to the appropriate application running in the RT 11, for example, based on the TCP port number. In the telephone service example, the RT 11 is the first point of translation. The processing branches (S5) based on whether or not the control module in the RT 11 detects a trigger, indicating a need to obtain data or instructions from higher level service logic, typically that reside in or accessible through the MGC 33.

For some calls, such as a call to a neighbor on the same ring 3, the internal service logic programmed into the RT 11 may control the call processing and provide any necessary translation between the dialed digits and the necessary destination information to route the call. In such a case, the decision in step S5 causes call processing to branch to step S8.

However, if the internal logic is not sufficient by itself to determine how to proceed, the call processing application in the RT 11 at step S5 branches to step S6, which triggers a query to higher level network service logic. This is essentially an SSP type function, i.e. to recognize a trigger event requiring higher-level input and signaling the appropriate network node to obtain the necessary input to complete the call processing. In the illustrated embodiment, when it hits the triggering event at S5, the RT 11 launches a query through a permanent virtual circuit through the network 1 to the MGC 33 (S6). The query contains the received dialed digits as well as source information about the calling customer's equipment/link. The source information may include source address data from the signaling packet sent by the originating soft NID 13 as well as supplemental data added by the RT 11.

Upon receiving the query from the RT 11, the MGC 33 accesses stored programs and associated service tables that define the network service logic, as it should apply to the particular call. Some aspects of this logic are service specific and apply to all customers who subscribe to the particular service. Other aspects of the logic may be subscriber specific and apply only to communications to or from a particular subscriber. Based on its network service logic, the MGC 33 formulates an appropriate instruction and sends the instruction in a response message, back through a virtual link through the network 1, to the serving RT 11 (S7). The instruction in the response message essentially tells the RT 11 how to process the customer's telephone call request, for example, how to provide the appropriate addressing information to the soft NID if the call is to be completed as dialed. In response, the RT 11 formulates a route message addressed to the originating soft NID 13 and sends that message through the ring 3 (S8). The route message, for example, provides the IP address currently used by the terminating soft NID 13 (or of the RT link to a legacy end office switch) and any other data necessary for setting up the requested call through the network 1.

Upon receipt of the response message from the RT 11, the originating soft NID 13 formulates an initial signaling message, using data received from the RT 11, and sends that message through the network 1 to the soft NID 13 of the called party, that is to say, to the terminating soft NID 13 (S9). This initial signaling message essentially indicates that the caller is attempting to call a party at the destination premises, in a manner analogous to an Initial Address Message (IAM) used in SS7 type interoffice signaling. Since the message is specifically addressed to the terminating soft NID 15, one or more of the RTs 15 and possibly one or more HDTs 23 will simply route the packet(s) for that message through to the appropriate local ring 3 and thus to the terminating soft NID 15.

If the phone service is not available at the destination premises at the time of the call, for example because the one internal line is in-use, the terminating soft NID 13 returns a response indicating that lack of availability. In response, the originating soft NID 13 would apply a busy signal to the telephone line going to the calling station 15.

For discussion purposes, assume that the phone service at the called location is available. In that case, the terminating soft NID 13 sends a response indicating that availability (S10). The soft NID 13 at the destination applies ringing current to the local customer premises wiring (S11), and the soft NID 13 at the calling location plays ringback tone to the caller (S12). If someone answers a telephone 15 at the destination (S13), then the terminating soft NID 13 sends an appropriate message through the network 1 to the originating soft NID 13 at the calling location (S14). The soft NIDs 13 stop local signaling (ringing or ringback tone) over the respective customer premises lines 55 and initiate two-way communication of packetized audio information (S15).

In the illustrated example, if the logic in the RT 11 can dispose of the call, then at step S5 there is no trigger event. As a result, the process flow skips from S5 to S8 in the example above. This situation occurs where the RT 11 already has sufficient data to provide the route message (S8) to instruct the soft NID 13 how to communicate with the terminating soft NID, for example if the terminating subscriber receives service via the same local ring 3 or another local ring 3 coupled to the same RT 11.

Although not shown in the call flow for simplicity, if the soft NID 13 at the originating location has sufficient storage and programming, then the CPU 71 in that unit may cache the addressing/routing information for the call to this destination in one of the memories 73. When the user subsequently dials the same number, the CPU 71 could initiate the communications with the destination, using the data from the cache, without the need to again signal the RT 11, reducing the signaling load on the network 1.

In the simple example of FIG. 6, the telephone 15 was an analog device or could have been an ISDN station. It is also possible to make telephone calls through the network 1 using a voice over IP type digital telephone, for example, coupled to the customer premises data link 59. In such an implementation, more of the intelligence for call set-up may reside in the phone itself, instead of relying on the call processing intelligence in the soft NID 13.

In the above-discussed call process flow, the RT 11 performed the SSP functions. For some types of calls, the HDTs 23 may perform a similar SSP function, for example, on in-bound calls intended for destinations served via the subtending rings. Of particular note, the logic in the RTs 11, the HDTs 23 and the MGC 33 is sufficient to implement and control essentially all of the typical telephone service features provided today to calling and called telephone subscribers.

These network nodes will also implement service logic, as needed, to control the other communications services through the network 1, including digital broadband transport services. For example, when a customer first initiates a data session with the ISP network 41 for Internet access or the like, the serving RT 11 alone or in combination with the logic of the MGC 33 may provide the necessary information to establish packet data communications between the soft NID 13 and the ISP network 41, in a manner similar to that used in the telephone call processing outlined above. At the customer premises, the session control may originate in the PC 17 or in the soft NID 13. Once the link to the ISP network 41 is set-up, the PC 17 typically does all of the addressing, and the soft-NID 13 functions simply as a pass-though device similar to a high-speed modem.

In the telephone service example discussed above, both stations 15 connected to the network 1 via a soft NID 13 and a local ring 3. However, in some cases, the caller or the called party may still be using telephone equipment 15' connected to a legacy end office switch 21. Processing of a call to or from such a station 15' will flow in a manner similar to that of FIG. 6, except that the logic and signaling functions of the respective soft NID are performed in the RT 11 connected to the switch 21 and translated as appropriate to extend signaling in an SS7 format over the link to that office.

For example, if the calling station goes through a soft NID 13, when the RT 11 returns the destination addressing information to the soft NID, that information points to the particular RT 11 connected to the switch 21, instead of to another soft NID 13. Subsequently, the signaling to establish the call will go through that RT to and from the switch 21. To the originating soft NID 13, the operation appears as described in the earlier example. However, to the switch 21, the call set-up signaling uses the standard SS7 messages, and the voice call is established in the same manner as a call coming in over a trunk from another office in the existing telephone network. The RT 11 connected to the switch 21 also performs the protocol conversions of the audio information between the formats used over the fast packet network and by the soft NID 13 and the standard PCM/TDM formats used by the legacy switch 21.

To the legacy telephone systems, the fast packet network appears as a combination of a tandem and an SS7 network of one or more signaling transfer points. For calls originating at a station 15', the switch 21 operates in the normal manner. The switch 21 communicates signaling in SS7 format over the link to the RT 11 and through the network 1 to the destination resource. If the call goes to a subscriber having a soft NID 13, the soft NID responds to any appropriate signaling and establishes the logical call connection.

If the outgoing legacy call is an interoffice call to station served through another legacy switch (not shown) or requiring inter-LATA transport through a network 29, the fast packet network passes the SS7 signaling through and hands it off to the appropriate legacy terminating system as unchanged SS7 messages. The switch 21 thus signals the remote system exactly as in the existing telephone network. Similarly, when the call is established, the fast packet portions of the network provide protocol conversions between the PCM/TDM of the switch 21 and the network protocols at both ends, to pass the encoded audio information through unchanged.

In the earlier discussion of the telephone call originating from the station 15, the originating RT 11 recognized a trigger event and initiated a query to the MGC 33 to obtain instructions or information as to how to process the call. For some services, a terminating RT 11 coupled to the switch 21 may perform a similar query communication and call processing based on the response from the MGC 33.

However, the legacy switch 21 has for some time been capable of implementing Advanced Intelligent Network (AIN) services, and this capability may be maintained in the network 1. For AIN services, the switch 21 will detect a trigger and launch an SS7 query, as in the existing AIN services on either outgoing or incoming calls or both. However, the query goes over the SS7 link to the serving RT 11. The RT 11 and other fast packet elements of the network 1 will pass the query through to the appropriate resource that serves as the Service Control Point (SCP) for the AIN service in question. The SCP function may simply be another application running on the server that functions as the MGC 11, or the SCP may be a computer coupled to the network 1 at any other convenient physical location or a computer in a legacy telephone network 29. When the SCP returns the AIN response message, in the appropriate Transaction Capabilities Application Part (TCAP) SS7 format, the network 1 transports that message through to the RT 11, which strips the message out of the network packets to recover the SS7 message. The RT 11 then transmits the standard format SS7 TCAP response message over the SS7 link to the switch 21, and the switch proceeds with the AIN service processing of the call, in the normal manner.

For a virtual private network (VPN) service, the network nodes may implement the necessary logic in a similar manner. However, typically, this type of "private" service will utilize pre-established logic narrowly defined in the programming of the user locations intended to participate in the VPN and in the interconnecting nodes. For example, if the network 1 uses ATM at the lower protocol level, the VPU service may utilize a permanent virtual circuit between the soft NID 13 at the customer premises 9 and the soft NID 13 coupled to the Intranet 43.

Those skilled in the art will recognize that the systems and techniques outlined above have a broad range of applications, and the embodiments admit of a wide range of modifications, without departure from the inventive concepts. While the foregoing has described what are considered to be the best mode and/or other preferred embodiments, it is understood that various modifications may be made therein and that the invention or inventions disclosed herein may be implemented in various forms and embodiments, and that they may be applied in numerous applications, only some of which have been described herein. It is intended by the following claims to claim any and all modifications and variations that fall within the true scope of the inventive concepts.

What is claimed is:

1. A communications network for providing logically switched telephone service and broadband data communication service, using packet transport, comprising:
    soft network interface devices, including a soft network interface device located at and serving each respective one of a plurality of customer premises receiving service via the communications network, each soft network interface device comprising: a telephone interface for providing telephone communications over customer premises media, a data interface for providing broadband data communications over customer premises media, and an optical network interface;
    remote terminals;
    first layer optical fiber rings, each first layer optical fiber ring providing packet transport, between optical network interfaces of a plurality of the soft network interface devices and a remote terminal, for the telephone service and the broadband data communication service;
    host digital terminals;
    second layer optical fiber rings, each second layer optical fiber ring providing packet transport between a plurality of remote terminals and a host digital terminal; and
    a third layer optical fiber ring providing packet transport between the host digital terminals; and
    a media gateway controller coupled to one of the rings for communication through the network, the media gateway controller being programmed to receive a query from and provide a responsive control instruction to at least one of a host digital terminal, a remote terminal and a soft network interface device to implement at least some service logic for control of the logically switched telephone service or the broadband data communication service when service is provided via the communications network to each customer premises;
    wherein one of the remote terminals comprises:
    optical network interfaces coupled to a plurality of the first layer rings;
    an optical network interface coupled to one of the second layer rings;
    a routing means;
    a high-speed bus coupled to the optical network interfaces and the routing means;
    at least one telephone switch interface, for communications with a legacy telephone switch; and
    a low-speed bus coupled to the routing means and to the at least one telephone switch interface.

2. The communications network as in claim 1, wherein:
    one of the soft network interface devices comprises a programmable data processing system; and
    the data processing system is programmed to implement a micro-gateway service control function of the network during processing of signals flowing between the optical network interface and the telephone and data communications interfaces of the at least one soft network interface device.

3. The communications network as in claim 2, wherein:
    the data processing system is programmable in response to provisioning data transmitted thereto via the network; and
    the data processing system is programmable in response to user commands transmitted thereto locally, from a respective customer premises media.

4. The communications network as in claim 1, wherein the routing means comprises a memory and a programmable control module for controlling writing data to the memory from the buses and reading data from the memory for output via the buses.

5. The communications network as in claim 1, wherein the at least one telephone switch interface comprises:
    a trunk interface for communication of telephone traffic between the one remote terminal and the legacy telephone switch in accord with a legacy telephone traffic protocol; and
    a signaling gateway for communication of signaling information between the one remote terminal and the legacy telephone switch in accord with a legacy telephone signaling protocol.

6. The communications network as in claim 1, further comprising a feature server coupled to one of the rings for communication of information to and from customers through the network in support of predetermined telephone service features.

7. The communications network as in claim 1, further comprising at least one data processing system coupled to one of the rings for provisioning communication with one or more of the soft network interface devices or with one or more of the terminals via the network.

8. The communications network as in claim 1, wherein the optical network interfaces of the soft network interface devices and the terminals are adapted to provide packet transport for the logically switched telephone service and the broadband data communication service through the network rings using an asynchronous transport mode (ATM) cell protocol.

9. The communications network as in claim 8, wherein the optical network interfaces of the soft network interface devices and the terminals are further adapted to transport ATM cells through one or more of the network rings using Synchronous Optical NETwork (SONET).

10. The communications network as in claim 1, wherein the telephone interface of one of the soft network interface devices comprises a telephone line card for two-way telephone communications over twisted-pair wiring within a respective one of the customer premises.

11. The communications network as in claim 10, wherein the data interface of the one soft network interface device comprises a local area network interface card.

12. The communications network as in claim 1, further comprising a router coupled to the third layer optical fiber ring for providing communications to and from the network via a wide area packet data network.

13. The communications network as in claim 1, further comprising a router coupled to the third layer optical fiber ring for providing traffic and signaling communications to and from the network via a wide area legacy telephone network.

14. The communications network as in claim 1, further comprising a soft network interface device, coupled to one of the first layer optical fiber rings, adapted for providing network services to equipment of an Internet Service Provider.

15. The communications network as in claim 1, further comprising a soft network interface device, coupled to one of the first layer optical fiber rings, adapted for providing network services to a private intranet.

16. A communications network for providing logically switched telephone service and broadband data communication service, using packet transport, comprising:
   soft network interface devices at respective customer premises, each soft network interface device comprising: a telephone interface for providing telephone communications over customer premises media, a data interface for providing broadband data communications over customer premises media, and an optical network interface;
   remote terminals;
   first layer optical fiber rings, each first layer optical fiber ring providing packet transport, between optical network interfaces of a plurality of the soft network interface devices and a remote terminal, for the telephone service and the broadband data communication service;
   host digital terminals;
   second layer optical fiber rings, each second layer optical fiber ring providing packet transport between a plurality of remote terminals and a host digital terminal; and
   a third layer optical fiber ring providing packet transport between the host digital terminals; and
   a media gateway controller coupled to one of the rings for communication through the network, the media gateway controller being programmed to provide at least some service logic for control of the logically switched telephone service or the broadband data communication service,
   wherein at least one of the host digital terminals is programmed to: detect trigger events during processing for at least some communications through the one host digital terminal, communicate with the media gateway controller to obtain service control instructions upon detection of the trigger events, and to control the at least some communications through the one host digital terminal in response to the service control instructions.

17. A communications network for providing logically switched telephone service and broadband data communication service, using packet transport, comprising:
   soft network interface devices at respective customer premises, each soft network interface device comprising: a telephone interface for providing telephone communications over customer premises media, a data interface for providing broadband data communications over customer premises media, and an optical network interface;
   remote terminals:
   first layer optical fiber rings, each first layer optical fiber ring providing packet transport, between optical network interfaces of a plurality of the soft network interface devices and a remote terminal, for the telephone service and the broadband data communication service;
   host digital terminals;
   second layer optical fiber rings, each second layer optical fiber ring providing packet transport between a plurality of remote terminals and a host digital terminal; and
   a third layer optical fiber ring providing packet transport between the host digital terminals; and
   a media gateway controller coupled to one of the rings for communication through the network, the media gateway controller being programmed to provide at least some service logic for control of the logically switched telephone service or the broadband data communication service, wherein:
   one of the remote terminals comprises a programmable control module; and
   the control module is programmed to: detect trigger events during processing for at least some communications through the one remote terminal, communicate with the media gateway controller to obtain service control instructions upon detection of the trigger events, and to control the at least some communications through the one remote terminal in response to the service control instructions.

18. A local communications network for providing logically switched telephone service and broadband data communication service to and from customer premises, using packet transport, comprising:
   soft network interface devices, including a respective soft network interface device located at and serving each respective one of the customer premises receiving service via the communications network, each respective soft network interface device comprising:
   a) a telephone interface for providing telephone communications over customer premises media;

b) a data interface for providing data communications over customer premises media;

c) an optical network interface; and d) a data processing system programmed to control the operations of the respective soft network interface device to function as a micro gateway with respect to communications services for the respective customer premises through the network;

a plurality of optical fiber rings, each ring being coupled to at least two of the optical network interfaces of the soft network interface devices; and a remote terminal, comprising:

1) optical network interfaces coupled to the optical fiber rings;

2) a broadband interface for communication via a higher level network media;

3) a control module for controlling routing through the remote terminal; and 4) a bus system coupled to the optical network interfaces, the broadband interface and the control module;

wherein:

the remote terminal further comprises at least one interface to a legacy telephone switch; and the bus system comprises:

i) a high-speed bus coupled to the optical network interfaces in the remote terminal, the broadband interface, and the control module; and ii) a low-speed bus coupled to the control module and to the at least one interface to a legacy telephone switch.

19. The communications network as in claim 18, wherein the broadband interface comprises an optical network interface adapted to communicate via an area-wide fiber optic ring.

20. The communications network as in claim 18, wherein the control module is programmed at least in part to cause the remote terminal to act as a service switching point (SSP) with regard to one or more services through the network.

21. A local communications network for providing logically switched telephone service and broadband data communication service to and from customer premises, using packet transport, comprising:

soft network interface devices at customer premises, each respective soft network interface device serving a respective customer premises, each respective soft network interface device comprising:

a) a telephone interface for providing telephone communications over customer premises media;

b) a data interface for providing data communications over customer premises media;

c) an optical network interface; and d) a data processing system programmed to control the operations of the respective soft network interface device to function as a micro gateway with respect to communications services for the respective customer premises through the network;

a plurality of optical fiber rings, each ring being coupled to at least two of the optical network interfaces of the soft network interface devices; and a remote terminal, comprising:

1) optical network interfaces coupled to the optical fiber rings;

2) a broadband interface for communication via a higher level network media;

3) a control module for controlling routing through the remote terminal; and 4) a bus system coupled to the optical network interfaces, the broadband interface and the control module, wherein the control module is programmed at least in part to cause the remote terminal to: detect trigger events during processing for at least some communications through the remote terminal, communicate with higher level control logic through the network to obtain service control instructions upon detection of the trigger events, and to control the at least some communications through the remote terminal in response to the service control instructions.

22. A remote terminal for use in a communications network for providing logically switched telephone service and broadband data communication service, the remote terminal comprising:

a local optical/electrical interface, for optical communications via a fiber ring to and from customer premises;

an area-wide optical/electrical interface for optical communications via a higher level optical network media at a rate higher than used for communications via the fiber ring to the customer premises;

a telephone interface for communication via a link to a legacy telephone switch;

a control module for controlling routing between the interfaces, wherein the control module comprises a central processing unit and memory storing a program for execution by the central processing unit;

a high-speed bus coupled to the optical/electrical interfaces and the control module; and a low-speed bus coupled to the control module and to the telephone interface, wherein:

execution of the program by the central processing unit causes the control module to control the remote terminal to perform service switching point functions with regard to communications relating to at least one network service, and in accord with the execution of the program, the control module causes the remote terminal to: detect trigger events during processing for the communications relating to at least one network service through the remote terminal, communicate via the area-wide optical/electrical interface with higher level control logic to obtain service control instructions upon detection of the trigger events, and to control the communications relating to at least one network service through the remote terminal in response to the service control instructions.

* * * * *